UNITED STATES PATENT OFFICE.

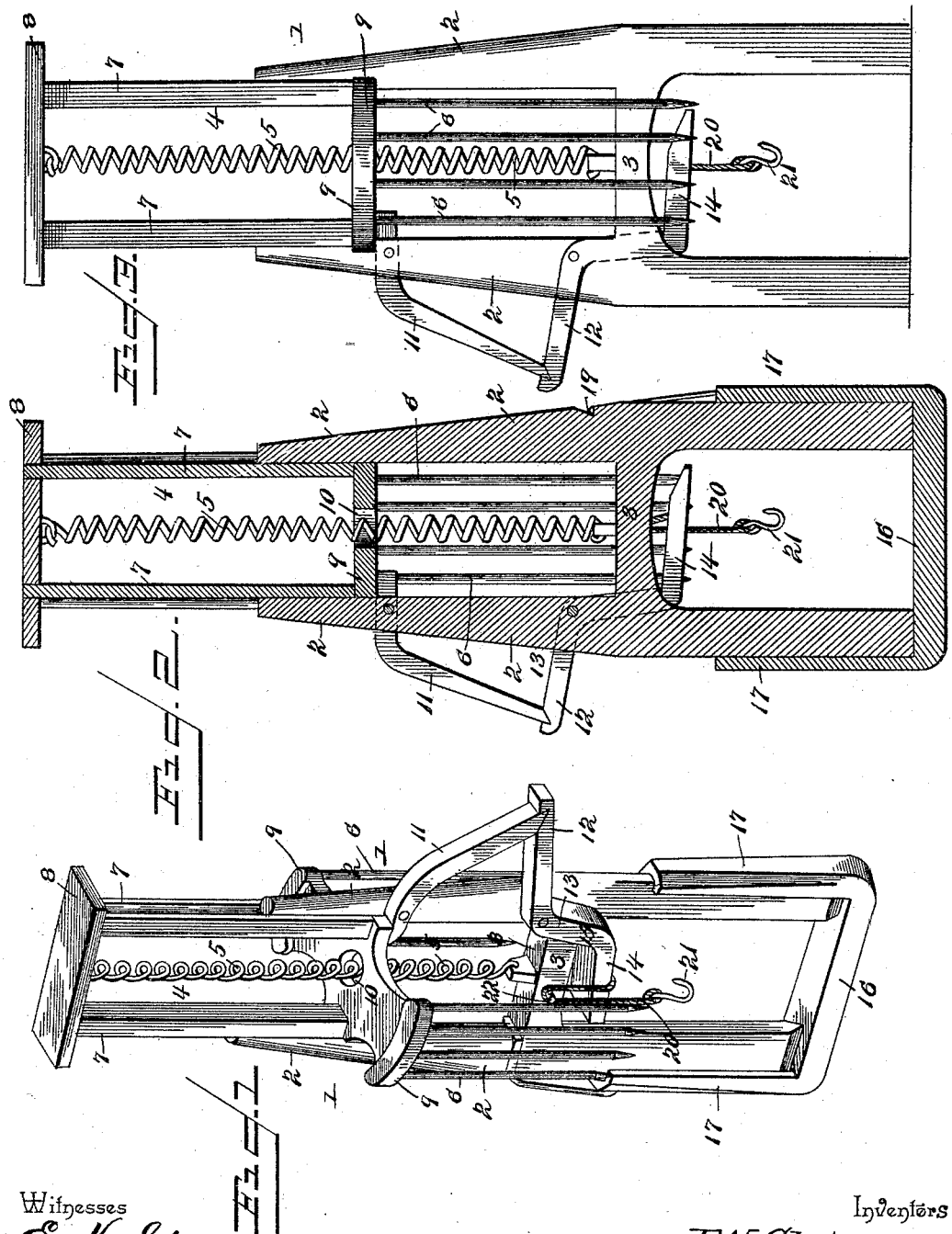

JOHN W. GLOVER AND EDMOND C. GLOVER, OF RANDALL, ARKANSAS.

ANIMAL-TRAP.

SPECIFICATION forming part of Letters Patent No. 497,004, dated May 9, 1893.

Application filed November 30, 1892. Serial No. 453,638. (No model.)

*To all whom it may concern:*

Be it known that we, JOHN W. GLOVER and EDMOND C. GLOVER, citizens of the United States, residing at Randall, in the county of Cleveland and State of Arkansas, have invented a new and useful Animal-Trap, of which the following is a specification.

The invention relates to improvements in animal traps.

The object of the present invention is to provide a simple and effective animal trap adapted for catching rats, and similar animals, and capable of being readily converted into a mole trap.

The invention consists in the construction and novel combination and arrangement of parts hereinafter fully described, illustrated in the accompanying drawings and pointed out in the claims hereto appended.

In the drawings—Figure 1 is a perspective view of a trap embodying the invention. Fig. 2 is a vertical sectional view. Fig. 3 is an elevation, the foot piece being removed to adapt the trap for catching moles.

Like numerals of reference indicate corresponding parts in all the figures of the drawings.

1 designates a main frame comprising opposite standards 2 and a central cross-piece 3 connecting the standards, and having mounted between the upper portions of the standards a vertically movable frame 4 adapted to be suddenly lowered by a spiral spring 5 to drive piercing tines 6 into the body of an animal.

The sliding frame consists of opposite side bars 7, a top cross bar 8 and a plate 9 connecting the lower ends of the side bars and provided at its ends with curved edges and having secured to them the piercing tines 6, which are arranged in a curved line. The inner opposed edges of the upper portions of the standards are rounded, and the outer edges of the side-bars 7 are correspondingly grooved to form ways. The spring has its upper end secured to the top cross-bar 8, and passes through a central opening 10 of the plate 9, and has its lower end secured to a lug 11 of the cross-piece 3, whereby when the sliding frame is elevated the spring will be distended and will force the vertically movable frame downward when the trap is sprung.

The vertically movable frame is held elevated by a latch 11 which has its upper end curved and pivoted to one of the standards near the upper end thereof and adapted to engage the lower face of the plate 9. The lower end of the latch 11 is beveled and is adapted to engage an arm 12 of a trigger 13 which is provided at the outer end of the said arm 12 with a shouldered notch to receive the lower end of the latch. The trigger or trip is angular and consists of the said arm 12 which extends outward, an arm 14 extending inward and a connecting piece 15 which has its inner face recessed to receive the cross-piece 3 and to form a shoulder at its lower end to limit the movement of the trigger.

When the trap is used for catching rats and similar animals the frame is mounted on a suitable supporting surface by means of screws or the like which are designed to pass through the base 16 of a U-shaped foot-piece. The foot-piece of the frame consists of the base 16 and vertical parallel sides 17 having their inner opposed faces grooved to receive the outer edges of the lower portions of the standards. One of the vertical sides 17 is provided with a swinging bail 18 to engage a notch 19 of the frame, whereby the foot-piece is held securely in the lower portion of the frame.

The foot-piece is removable, and the lower ends of the standards are provided with chiseled edges to adapt them to be inserted in the ground, whereby the lower portion of the frame may be made to straddle a mole run. The lower arm 14 of the trigger is adapted to be arranged above the run, so that a mole in passing through the run will raise the earth sufficiently to lift the arm 14 of the trigger and spring the trap. The arm 14 of the trigger is provided with a cord 20 which has a hook 21 to receive a bait, and which is adapted to be hung over a supporting knob 22, whereby an animal in attempting to obtain the bait will operate the trigger, and spring the trap.

It will readily be seen that the trap is simple and effective in operation, and that it may be readily changed to adapt it for catching moles or rats and similar animals.

We desire it to be understood that changes in the form, proportion and the minor details of construction may be resorted to without departing from the principle, or sacrificing any of the advantages of the invention.

What we claim is—

1. A trap comprising a frame composed of opposite standards and a central cross-piece connecting the same, a vertically movable frame mounted between the upper portions of the standards and consisting of opposite side bars, a top cross-bar, and a bottom plate having a central opening and provided with depending piercing tines arranged at its ends and disposed at opposite sides of the trap, a spring passing through the opening of the bottom plate and having one end secured to said top cross-bar and its lower end attached to the cross-piece, and a trip mechanism substantially as described.

2. A trap comprising a supporting frame composed of opposite standards and a central connecting piece, an approximately U-shaped foot-piece having opposite parallel sides receiving the lower portions of the standards between them, a vertically movable frame mounted between the upper portions of the standards and provided with depending piercing tines, a spring for forcing the movable frame downward, and a trip mechanism, substantially as described.

3. A trap comprising a supporting frame composed of opposite standards and a connecting piece arranged at the middle of the frame, said frame being provided with a notch 19, a vertically movable frame provided with depending piercing tines, a latch having its upper portion curved and pivoted to one of the standards and adapted to engage the vertically movable frame, a trip pivoted to the supporting frame and provided with a notch to receive the latch and composed of the oppositely extending arms 12 and 14 and a connecting piece 15, a supporting knob projecting from the supporting frame, a bait hook, a flexible connection between the bait hook and the trigger, a removable foot piece consisting of a base and opposite parallel sides provided with grooves and receiving the lower portions of the standards, and a bail connected to one of the sides of the foot-piece and arranged to engage the notch 19, substantially as described.

In testimony that we claim the foregoing as our own we have hereto affixed our signatures in the presence of two witnesses.

JOHN W. GLOVER.
EDMOND C. GLOVER.

Witnesses:
H. W. ROGERS,
J. D. OVERTON.